G. HOTTE.

Coffee Pot.

No. 99,438.

Patented Feb. 1, 1870.

Witnesses
C. Wahlers
E. F. Kastenhuber

Inventor:
G. Hotte
per
Van Santvoord & Hauff
Attys.

United States Patent Office.

GEORGE HOTTE, OF NEW YORK, N. Y.

Letters Patent No. 99,438, dated February 1, 1870.

IMPROVEMENT IN COFFEE-POTS

The Schedule referred to in these Letters Patent and making part of the same.

*To all whom it may concern:*

Be it known that I, GEORGE HOTTE, of the city, county, and State of New York, have invented a new and improved Heater for Coffee-Kettles and other Vessels; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
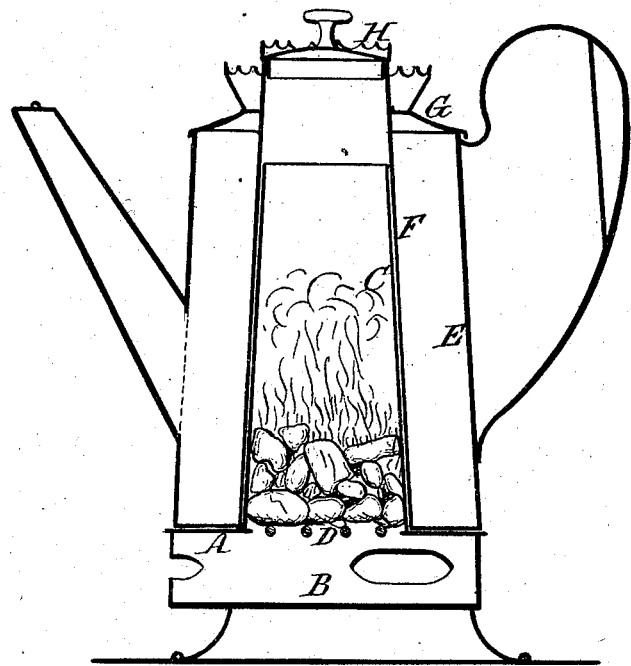
Figure 1 represents a vertical central section of this invention.
Figure 2:
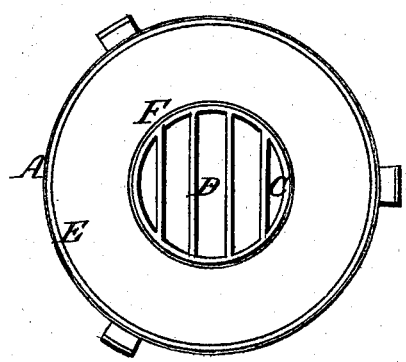
Figure 2 is a transverse section of the same.

This invention consists in the arrangement of a platform, which forms the top of an ash-pan, and the support for a cylindrical fire-pot, provided at its bottom with a fire-grate, in combination with a vessel, furnished with a tube, extending up through its entire height, and capable of surrounding the cylindrical fire-pot of the heater, in such a manner, that by filling said fire-pot with fuel, and igniting the same, the contents of the vessel placed on the platform of the heater, and over the fire-pot, are rapidly and conveniently heated.

In the drawing—

The letter A designates a platform, which forms the top of the ash-pan B, and from which rises the cylindrical fire-pot C.

This fire-pot is provided with a grate, D, and the ash-pan B is furnished with a door, and with suitable air-holes, so that the air has free access to the grate and fire-pot.

The vessel E, which I use in connection with my heater, is provided with a tube, F, extending up through its entire height, and sufficiently large to embrace the cylindrical fire-pot, so that said vessel can be placed upon the platform A, as shown in fig. 1, of the drawing.

The vessel E is provided with a cover, G, and the tube F with a cover, H.

When it is desired to heat the contents of the vessel E, the fire-pot C is filled with charcoal or other suitable fuel, which is ignited from below, the cover H of the tube F is removed, and the vessel E is put upon the platform A, as shown in fig. 1.

By the heat radiating from the walls of the fire-pot, the contents of the vessel E are rapidly heated. In order to extinguish the fire in the fire-pot, the cover H is put on, and the fire is smothered.

By these means, the contents of a coffee or teapot, or of any other vessel, can be rapidly and conveniently heated, with a comparatively small expenditure of fuel, and without producing a disagreeable odor in the room in which the heater is used.

What I claim as new, and desire to secure by Letters Patent, is—

The platform A, forming the top of the ash-pan B and the support for the fire-pot C, in combination with a vessel, provided with an internal tube, F, fitting over the fire-pot C, substantially as shown and described.

GEORGE HOTTE.

Witnesses:
W. HAUFF,
E. F. KASTENHUBER.